United States Patent [19]

Clark

[11] Patent Number: 5,623,741
[45] Date of Patent: Apr. 29, 1997

[54] BRUSH PAD WITH IRREGULAR FINGERS

[76] Inventor: Gaylord J. Clark, 4769 Paw Paw Lake Rd., Coloma, Mich. 49038

[21] Appl. No.: 559,134

[22] Filed: Nov. 17, 1995

[51] Int. Cl.⁶ ............................................. B60S 3/06
[52] U.S. Cl. ..................... 15/230.16; 15/97.3; 15/DIG. 2
[58] Field of Search ........................ 15/21.1, 53.1, 15/53.2, 53.3, 97.3, 230, 230 R, 230.14, 230.15, 230.16, 230.17, 230.19, DIG. 2; 451/466, 468, 469

[56] References Cited

U.S. PATENT DOCUMENTS

| | | | |
|---|---|---|---|
| 2,682,734 | 7/1954 | Peterson | 15/230.16 |
| 3,772,723 | 11/1973 | Krimm | 15/55.3 |
| 4,320,551 | 3/1982 | Roncaglione | 15/53.2 |
| 4,377,878 | 3/1983 | Pecora . | |
| 4,653,135 | 3/1987 | Clark . | |
| 5,396,680 | 3/1995 | Belanger . | |
| 5,423,718 | 6/1995 | Tyler et al. | 451/466 |

Primary Examiner—David Scherbel
Assistant Examiner—Terrence Till
Attorney, Agent, or Firm—Flynn, Thiel, Boutell & Tanis, P.C.

[57] ABSTRACT

A vehicle finishing apparatus provided with a vehicle finishing pad having slits cut in the pad in patterns other than parallel, straight and perpendicular to the brush axis so that the individual pad strips make finishing contact with the vehicle surface over an area having a transverse width which is greater than the strip width. The slits in a preferred embodiment are cut in a curved fashion, thereby creating a longer edge surface on the strips and increasing the transverse contact area with the vehicle surface as well as improved edge contact with the vehicle surface.

24 Claims, 4 Drawing Sheets

1

BRUSH PAD WITH IRREGULAR FINGERS

FIELD OF THE INVENTION

This invention relates to a vehicle finishing apparatus and, more particularly, to an improved finishing element, specifically a finishing cloth or pad having irregular shaped finishing fingers or strips.

BACKGROUND OF THE INVENTION

Finishing devices such as car finishing brushes and polishing or buffing devices are extensively utilized in automatic car and truck finishing machinery of the type wherein remotely or automatically controlled equipment is used to wash, wax, polish or buff the surface of the vehicle. Conventionally these finishing devices include a drum biased toward the vehicle, which drum rotates to cause finishing elements on the drum to wash, dry, polish or otherwise contact the vehicle surface.

For many years these finishing drums have constituted brushes in that the drum was provided with a plurality of elongated flexible brush bristles, such as flexible plastic filaments, for finishing contact with the vehicle surface. Many of the finishing devices, however, have now eliminated the use of bristles, and in place thereof have substituted finishing elements formed from flexible cloth pads. In a finishing device of this type, the drum is conventionally provided with mounting slots or grooves extending longitudinally along the periphery thereof, and each slot generally mounts therein one or more finishing pads, each of which is provided with a mounting part along an edge thereof for securement within the drum slot. The pad has a large number of parallel cuts or slits which project inwardly from the free edge thereof so as to form a plurality of elongated flexible strips which effectively contact the vehicle surface to perform the desired finishing operation.

Cloth pads of the general type mentioned above are now extensively utilized, and it is common practice to cut uniform parallel slits in the pad to produce these strips, which slits extend in substantially perpendicular relation to the drum axis when the pad is in a flat extended condition. The use of cloth pads improves the finish or sheen on the vehicle surface, but the cloth pads have their disadvantages. One problem with cloth pads is the considerable noise generated when the pad strikes the vehicle, so that typically the cloth pads are rotated at about two-thirds or less of the typical rotational speed of bristle brushes to decrease the noise level to an acceptable level. Cloth brushes are also slowed to minimize damage to vehicle protrusions such as windshield wipers and antennas. However, the quality of the vehicle finishing decreases when the rotational speed decreases since the vehicle is not being struck as many times with the finishing elements. Accordingly, an operator may slow the vehicle conveyor speed to accommodate the slower cleaning action of cloth brushes in order to improve the quality of the wash, although such is undesirable since it results in lowered vehicle finishing capacity.

Accordingly, it is an object of this invention to provide an improved vehicle finishing pad which is believed to provide an improved finishing operation.

More specifically, this invention relates to an improved vehicle finishing pad wherein the vehicle finishing pad is of the type having slits cut in the pad in patterns other than parallel, straight and perpendicular to the brush core or axis so that the individual strips make finishing contact with the vehicle surface over an area having a transverse width which is greater than the strip width. In the improved finishing pad of this invention, the slits in a preferred embodiment are cut in a curved fashion, thereby creating a longer edge surface on the strips and increasing the transverse contact area with the vehicle surface. In another embodiment, the slits may be straight lines cut at a skewed angle relative to the drum axis.

In the present invention, the finishing pad is preferably provided with slits which result in the pad strips having edges which are nonlinear so as to have longitudinally spaced edge portions which extend in angled relationship with respect to one another, whereby the nonlinear edge has increased frictional contact with the vehicle surface, as well as increased contact with the vehicle surface over a greater transverse area, so as to improve the quality of the finishing operation. The edge preferably is of an undulating curved configuration in the lengthwise extent thereof, such as having a configuration resembling a sine wave.

In the preferred embodiment, the undulating curved edges of each strip preferably extend in parallel relationship to one another so that the strip has a generally uniform width throughout the length thereof, and the transverse magnitude or displacement of the undulations is preferably of a magnitude which is a significant percentage of the strip width, and for example may be approximately equal to the strip width.

In alternative embodiments, the opposite edges of each strip may be disposed in nonparallel relationship, and the strip itself may be of nonuniform width throughout the length thereof, while still providing edges which result in increased transverse contact area with the vehicle so as to improve the finishing operation.

The pad of this invention also provides a high degree of flexibility with respect to the manner of mounting the pads on a rotating drum so as to vary and in fact increase the frictional contact of the pads with the vehicle to improve the finishing operation. For example, inasmuch as a plurality of pads are normally mounted on a rotary brush core in circumferentially spaced relationship therearound, with each of the pads being mounted so as to extend longitudinally of the brush core, the present invention enables some of the pads to be axially reversely mounted on the core relative to other pads. For example, selected angularly spaced pads or groups of pads, such as every other pad circumferentially around the brush core, can be reversely axially mounted on the core relative to the remaining pads. This results in the strip edges of the reversely oriented pads being disposed in circumferentially nonaligned relationship with the edges of the non-reversely oriented pads, thereby significantly increasing the friction and thus providing for a more aggressive cleaning or finishing action as the rotating cloth brush contacts the vehicle surface.

Other objects and purposes of the invention will be apparent to persons familiar with structures of this general type upon reading the following specification and inspecting the accompanying drawings.

Figure 2:
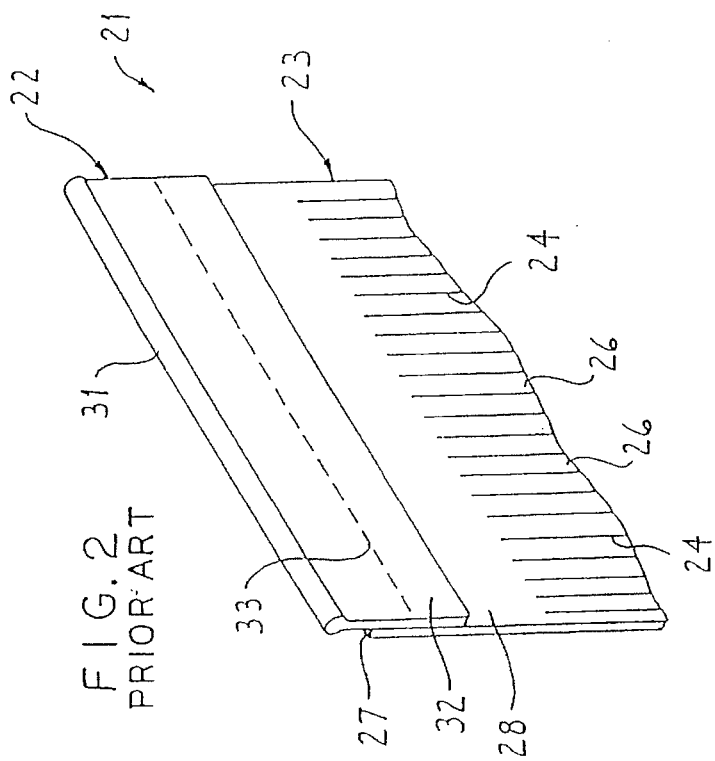
FIG. 2 is a fragmentary perspective view of a conventional finishing pad of the type having uniform parallel slits cut therein.

Certain terminology will be used in the following description for convenience in reference only, and will not be limiting For example the words "upwardly", "downwardly", "rightwardly" and "leftwardly" will refer to directions in the drawings to which reference is made. The words "inwardly" and "outwardly" will refer to directions toward and away from, respectively, the geometric center of the apparatus and designated parts thereof. Said terminology will include the words specifically mentioned, derivatives thereof, and words of similar import.

DETAILED DESCRIPTION

Figure 1:
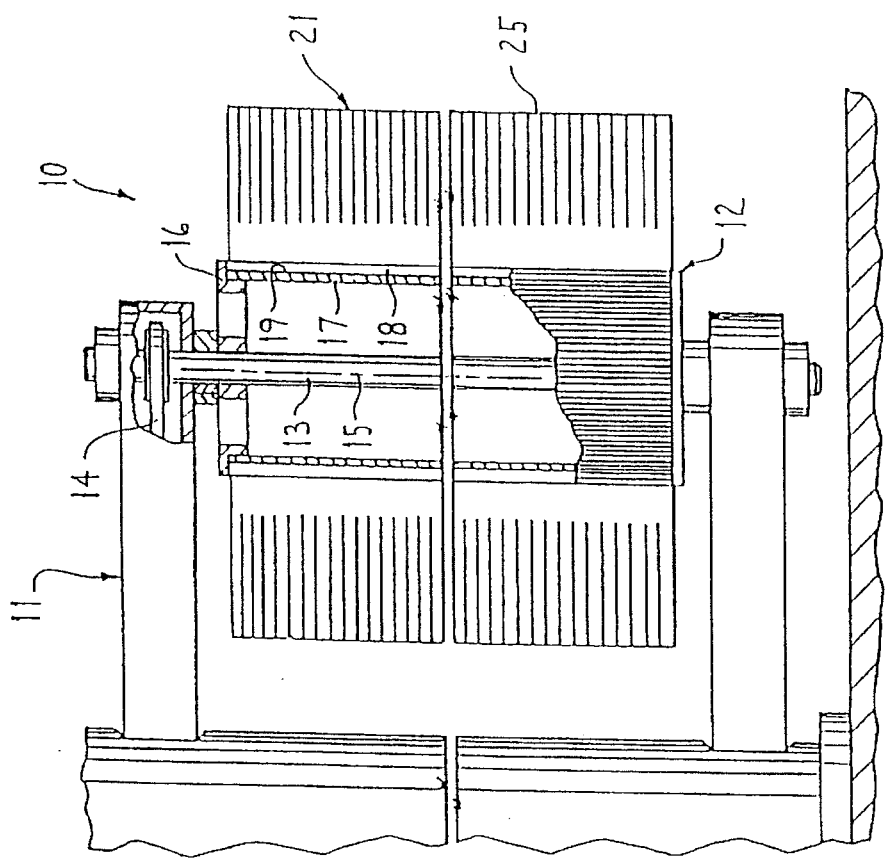
FIG. 1 is a side elevational view, partially cut away, of a conventional vehicle finishing device having a conventional finishing element mounted thereon.

FIG. 1 illustrates a portion of a vehicle finishing apparatus 10 which includes a conventional mechanism 11 for biasing a vehicle finishing device 12 against the surface of a vehicle (not shown) to effect finishing of the surface, such as washing, buffing, polishing or drying of the surface. The finishing device 12 is secured to an axle 13 which is rotatably supported on and extends between the arms which form a part of the mechanism 11. The axle in turn is driven by a conventional drive mechanism 14 so as to effect rotation of the finishing device about the axis 15 of the axle.

The finishing device 12 in the illustrated embodiment comprises a support member which is a conventional cylindrical drum 16 which surrounds and is releasably but non-rotatably coupled to the axle 13 so as to be rotatably driven thereby. This drum 16 has an annular and generally cylindrical peripheral wall 17 which, on the outer periphery thereof, has a plurality of axially elongated ribs 18 projecting outwardly therefrom. These ribs 18 define a plurality of elongated grooves or slots 19 which extend axially throughout the length of the drum 16. These grooves 19 have the lower ends thereof closed by a suitable flange associated with the lower end hub of the drum. The grooves 19, which are disposed in closely adjacent but parallel relationship around the complete periphery of the drum, open radially outwardly but have a reduced width or throat at the radially outer end thereof so as to permit mounting of a flexible finishing unit 21 on the drum. In this respect, each slot mounts at least one such finishing unit therein and, in many arrangements, several such finishing units can be disposed in longitudinally aligned relationship along the slot, depending upon the construction of the drum and the overall function of the finishing device 12.

A conventional finishing pad unit 21 is illustrated in FIG. 2, this being a conventional cloth type pad unit and in the illustrated embodiment being of one ply thickness. This finishing unit 21 is defined by two principle portions or members, namely a mounting member 22 and a cloth pad 23.

The cloth pad 23 is defined by a thin typically rectangular sheet-like flexible cloth member which is provided with a plurality of generally parallel cuts or slits 24 formed therein and projecting inwardly from the free edge 25 thereof in generally perpendicular relation to drum axis 15, so as to result in the formation of a plurality of elongated flexible strips 26 which are adapted for contact with and conformance to the irregularities of the vehicle surface. These slits 24 normally terminate at a distance several inches from the other edge 27 of the pad member, thereby defining on the pad member a sheet-like mounting or attaching portion 28 which at least partially overlaps and is fixedly attached to the mounting member 22 as described below.

The mounting member 22, in the illustrated embodiment, includes a drum mounting part 31 extending longitudinally along one edge thereof, the latter being fixedly attached to a pad mounting part 32. The drum mounting part 31 is formed generally as an elongate rod-like member having a rounded periphery in cross section. The rod-like part 31 has a cross-sectional size to enable it to freely longitudinally slide into the groove 19 of the drum, with the cross section of the part 31 being greater than the mouth of the groove so that the rod-like part is hence confined within the groove. The cross section of the rod-like part, however, is typically slightly smaller than the groove cross section to facilitate mounting and removal of the finishing units relative to the drum. The pad mounting part 32 is formed generally as a thin sheet-like part or flange which is fixed to the rod part 31 along one longitudinally extending side thereof, with the pad mounting flange 32 projecting radially outwardly from the rod-like part 31 through a limited distance. This pad mounting flange 32 has a thickness which is substantially less than the transverse cross section of the rod-like part 31 to enable it to project radially outwardly through the mouth of the groove 19. The pad mounting flange 32 in turn overlaps at least a part of the pad attaching portion 28, and these overlapping parts 28 and 32 are fixedly secured, such as by stitching, staples or the like, same being diagrammatically indicated at 33. As so secured, the edge 27 of the pad is spaced outwardly at least a small distance from the rod-like part 31 so that the mounting flange 32 has a portion thereof defined therebetween which effectively extends through the mouth of the groove.

The finishing pad unit 21 illustrated in FIG. 2 is of a single-ply construction in that only a single cloth pad 23 is attached to the mounting part 22. It will be appreciated, however, that the finishing unit can also readily be of a construction having two or more plies if desired in that further cloth pads can be provided and attached to the pad mounting flange 32 if desired.

Figure 3:
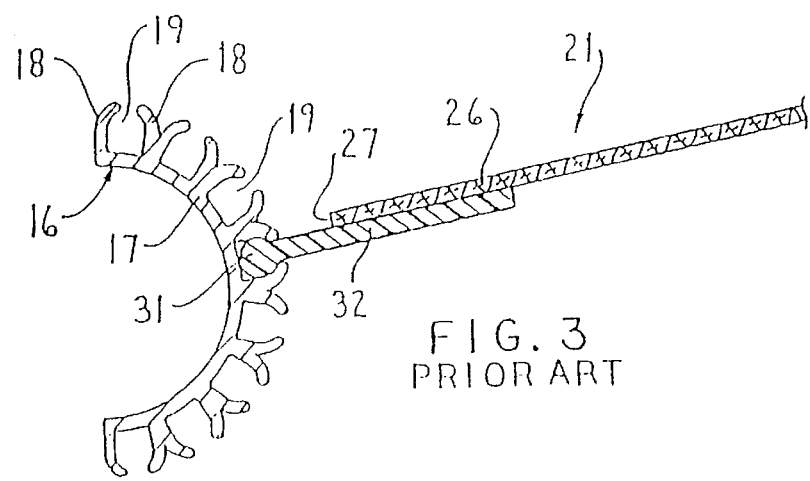
FIG. 3 is an enlarged fragmentary sectional view illustrating the conventional finishing pad of FIG. 2 as mounted on a support member such as a rotary drum.
Figure 4:
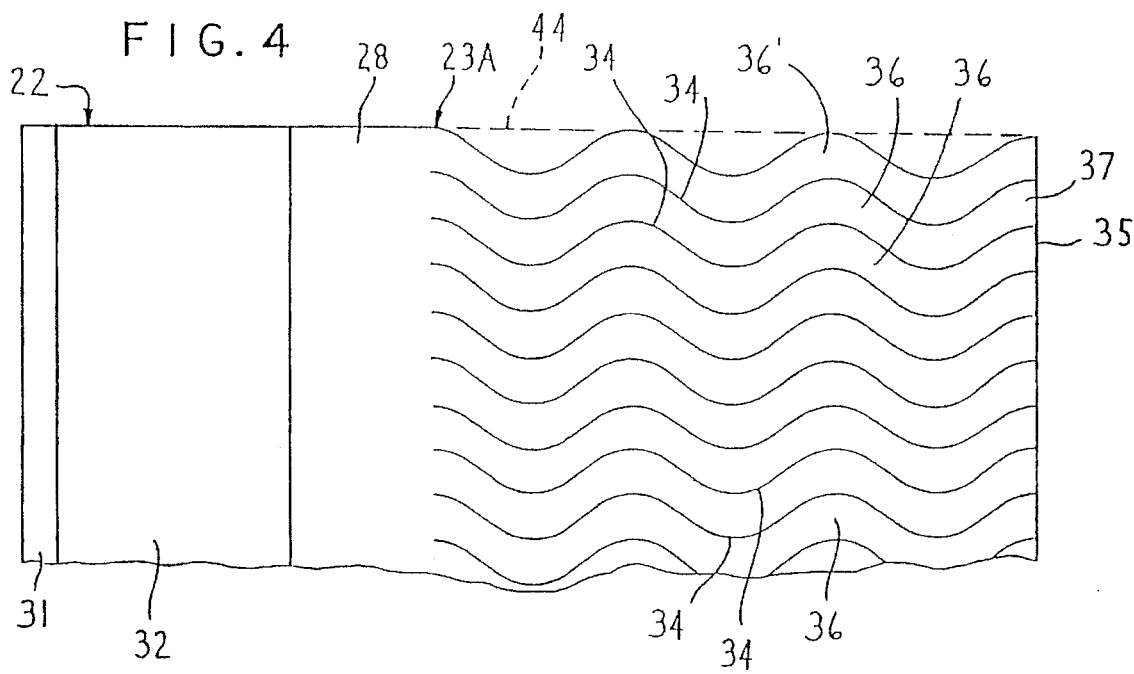
FIG. 4 is a fragmentary elevational view illustrating a preferred embodiment of the improved finishing pad of the present invention.

Considering now the present invention and referring specifically to FIG. 4, the cloth pad 23A according to a preferred embodiment is defined by a thin and typically rectangular sheetlike flexible cloth member having a plurality of elongate cuts or slits 34 formed therein and projecting inwardly from the free edge 35 so as to result in the formation of a plurality of an elongated flexible strips 36. The cuts or slits 34 terminate at a distance from the other edge of the pad member so as to define a sheetlike mounting or attaching portion 28 which is then secured to the mounting member 22 for attachment to a rotating drum in the same manner as described above relative to FIGS. 1–3.

Figure 5:
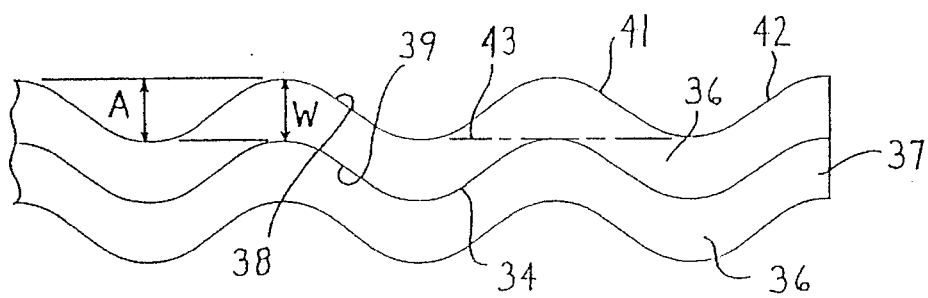
FIG. 5 is an enlarged fragmentary elevational view illustrating the slit curvature in the finishing pad of FIG. 4.

As shown by FIG. 4 and as illustrated on an enlarged scale in FIG. 5, the cuts or slits 34 result in each strip 36 being defined between edges 38 and 39 which extend lengthwise of the respective strip and terminate generally at the strip free edge 37.

The lengthwise-extending edges 38 and 39 are preferably nonlinear and, in the illustrated and preferred embodiment of FIGS. 4 and 5, are of an undulating configuration in the lengthwise extent thereof so as to have peaks and valleys which are spaced lengthwise along the edge. This results in the edge having edge portions such as 41 and 42 which are spaced lengthwise of the strip and which are angled so as to extend in transverse relationship relative to the longitudinal direction 43 of the strip, which direction 43 is perpendicular to the rotation axis of the support drum. Due to the undulating configuration of the edge 38, the transversely projecting edge portions 41 and 42 not only extend in transverse relation relative to the direction 43, but are also angled with respect to one another so that these edge portions 41 and 42 are reversely angled relative to the direction 43 such that one edge portion 41 faces generally outwardly toward the free end of the strip whereas the other edge portion 42 generally faces inwardly in the opposite direction.

The edge 38 and specifically the curved undulating configuration thereof preferably approximates a sine curve, and the strip 36 is of sufficient length such that the edge 38 preferably includes at least about two cycles of the sine curve, namely two sequential repetitions of the peaks and valleys.

In the preferred embodiment of FIGS. 4 and 5, the cuts or slits 34 are all preferably formed in parallel relationship with one another so that the opposite lengthwise-extending edges 38 and 39 of each strip have the same curved undulating configuration and thus extend in parallel relationship with one another. The strips 36 preferably have a uniform width W which approximately equals the amplitude A of the edge curvature, whereupon in operation each strip 36 will thus be contactable with a transverse area of the vehicle surface which is about twice the width W of the strip 36.

It will also be appreciated that the edgemost strips of the pad, such as the edgemost strip 36' illustrated in FIG. 4, can if desired be provided with a conventional straight edge along one side of the strip, such as the outer edge as designed by the dotted line 44 in FIG. 4, rather than an undulating curved edge, so as to minimize voids or open areas between axially aligned pads as mounted on a common brush core.

In operation, a plurality of the improved finishing pads 23A are mounted in circumferentially spaced relationship around the drum 16 in the manner illustrated by FIGS. 1 and 3, whereupon the pads 23A project generally radially outwardly from the drum relative to the axis 13 thereof during rotation. While the individual strips 36 of the pad 23 tend to project radially outwardly during rotation such that the longitudinal direction 43 of the strips is generally perpendicular to the drum axis 13, nevertheless the nonlinear or undulating edges 38 and 39 of the strips are themselves disposed generally in nonperpendicular relationship relative to the rotational axis 13. This thus results in the edges 38 and 39 of the strips 36, and particularly the edge portions 41 and 42, making contact with the vehicle surface in transverse relation relative to the perpendicular direction 43 so that not only do these edge portions 41 and 42 contact a wider transverse area of the vehicle, but they also provide increased frictional contact with the vehicle surface due to the transverse sliding relationship created by these edges in comparison to a conventional perpendicular straight edge. This thus increases the aggressiveness of the washing or finishing action created by the pad strips contacting the vehicle surface, and is thus believed to provide an improved transfinishing operation in comparison to that achieved utilizing conventional straight strips of the type possessed by the conventional pads of FIG. 2.

Figure 6:
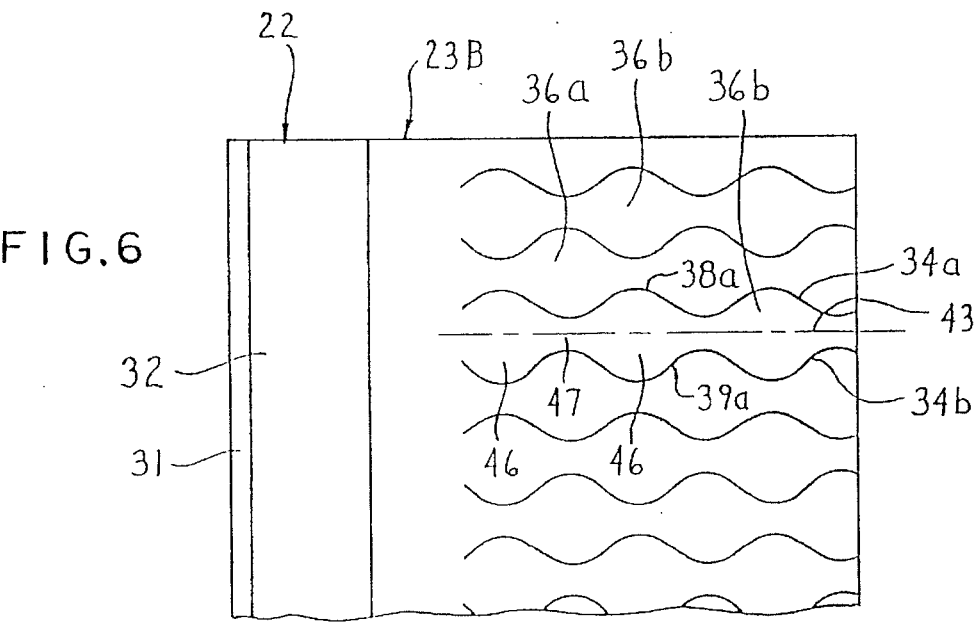
FIGS. 6–8 are elevational views similar to FIG. 4 but illustrating alternative embodiments of the improved finishing pad of the present invention.

Referring now to FIG. 6, there is illustrated an alternative embodiment of an improved finishing pad 23B according to the present invention. The pad 23B is again provided with a plurality of cuts or slits 34a and 34b projecting inwardly from the free edge of the pad. The adjacent slits 34a and 34b in this embodiment are identical but are mirror images of one another relative to the longitudinally extending centerline 43 of the respective strip, which centerline 43 extends in perpendicular relation to the drum axis. This results in each strip 36a or 36b having opposed lengthwise-extending edges 38a and 39a which have identical nonlinear and more specifically undulating curvatures, such as sine waves. In this embodiment, however, the edges 38a and 39a are not parallel inasmuch as they are mirror images of one another about the centerline 43, and this results in each strip 36a or 36b being defined by a series of alternating and lengthwise joined portions 46 and 47, with the portions 46 being transversely enlarged relative to the narrower interconnecting portions 47. This results in the strips 36a and 36b being defined by a series of enlarged lobe portions 46 which are interconnected through narrow bridge portions 47. However, since the edges 38a and 39a each have a configuration which substantially corresponds to the edge 38 as described in detail above, these edges provide the same increased friction and finishing capability when a rotary brush employing the pads 23A is disposed in rotatable contacting relationship with a vehicle surface.

Figure 7:
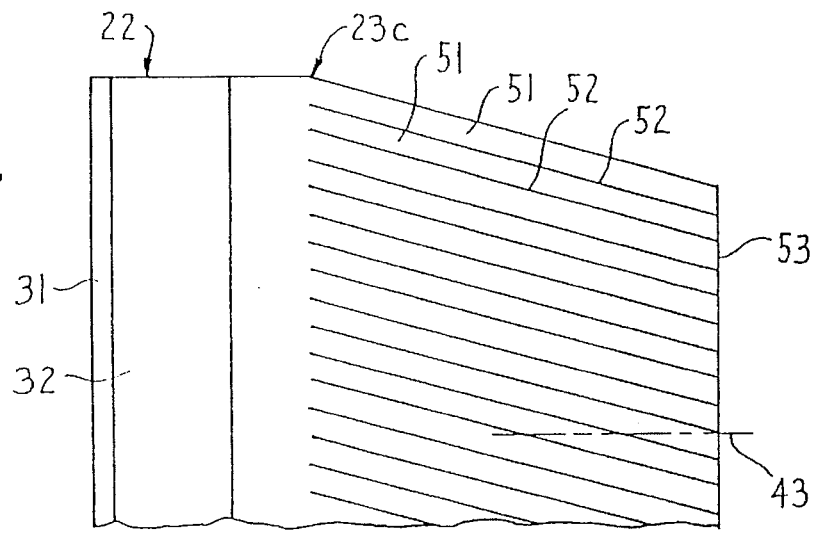

Referencing now FIG. 7, there is illustrated a further embodiment of the invention wherein the pad 23C again includes a plurality of elongate cantilevered strips 51 which are formed by cuts or slits 52 which project inwardly from the free edge 53 of the pad. In this variation the slits 52 all extend parallel with one another such that the strips 51 are all of uniform width in the lengthwise direction and are defined by generally parallel and linear side edges. However, the slits 52 extend in angled or skewed relation relative to the plane or direction 43, the latter being perpendicular to the rotational axis 13 of the drum. Due to the fact that the cuts or slits 52 are angled axially downwardly relative to the direction or plane 43, this results in each strip 51 having its side edges extending in angled relation to the plane 43 so as to result in the edges being dragged across the vehicle surface in a skewed or transversely angled relationship so as to increase the frictional contact with the vehicle, and at the same time provide increased overlap of the strips with the vehicle surface.

Figure 8:
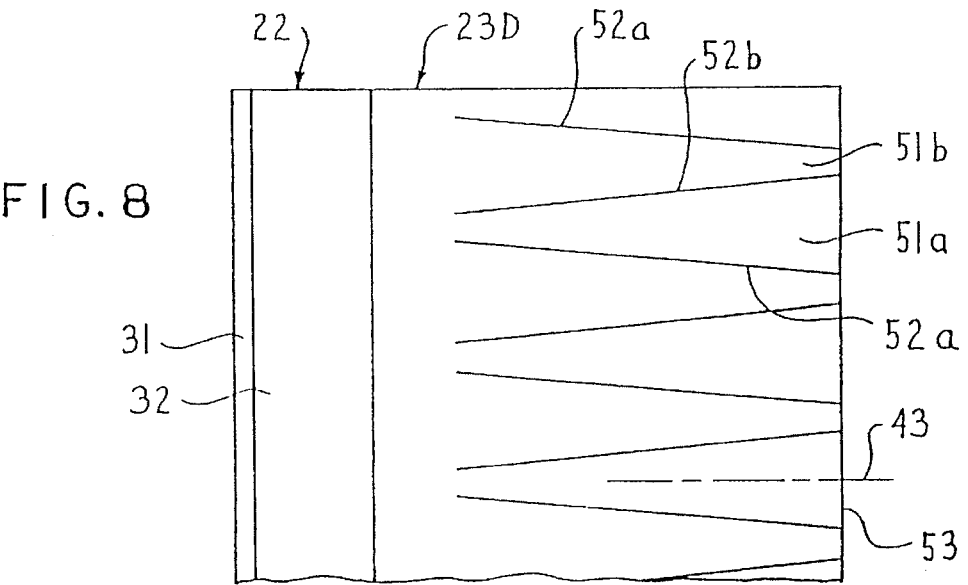

A still further embodiment of the invention is illustrated by FIG. 8, and in this embodiment straight line cuts or slits 52a and 52b project inwardly from the free edge of the pad 23D. These cuts 52a and 52b both extend inwardly from the free edge in angled relationship relative to the perpendicular plane 43, and in fact the cuts 52a and 52b are reversely angled relative to the plane 43 so that the adjacent cuts converge or diverge relative to one another as they project inwardly from the free edge 53. This results in adjacent but alternating strips 51a and 52a of variable width throughout the length thereof, with the strips 51a in the illustrated embodiment being of a tapered increasing width as they project toward the free ends, and the intermediate strips 51b being of a tapered decreasing width as they project toward the free ends. Each strip 51a and 51b is again defined by straight side edges, but these side edges are not only angled relative to the perpendicular plane 43, but are also angled relative to one other, and thereby provide increased transverse edge contact with the vehicle surface, as well as increased overlap by adjacent strips with the vehicle surface, thereby improving the quality of the finishing operation when the rotary brush is disposed in contacting relationship with the vehicle surface.

Figure 9:
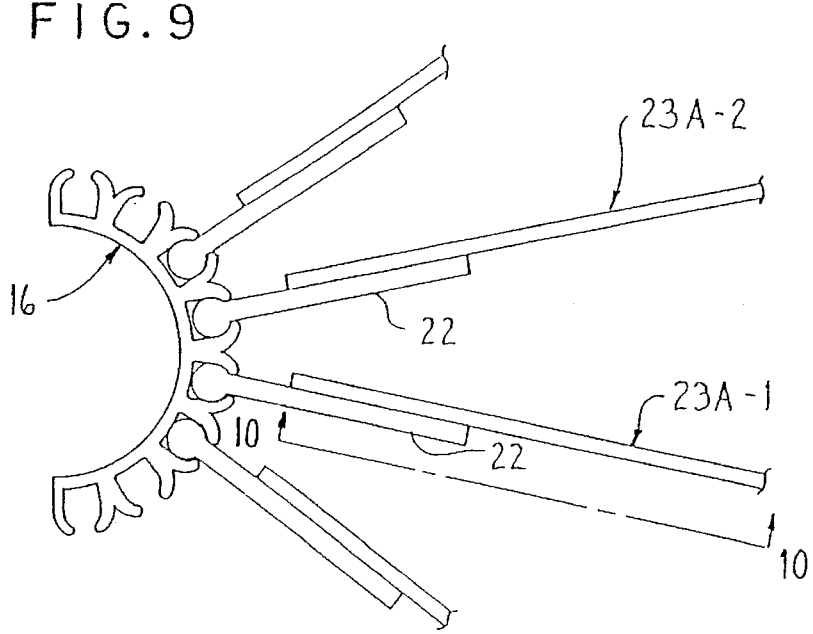
FIG. 9 is an enlarged fragmentary sectional view showing a plurality of finishing pads of the present invention mounted on a rotary drum in accordance with a variation of the present invention.
Figure 10:
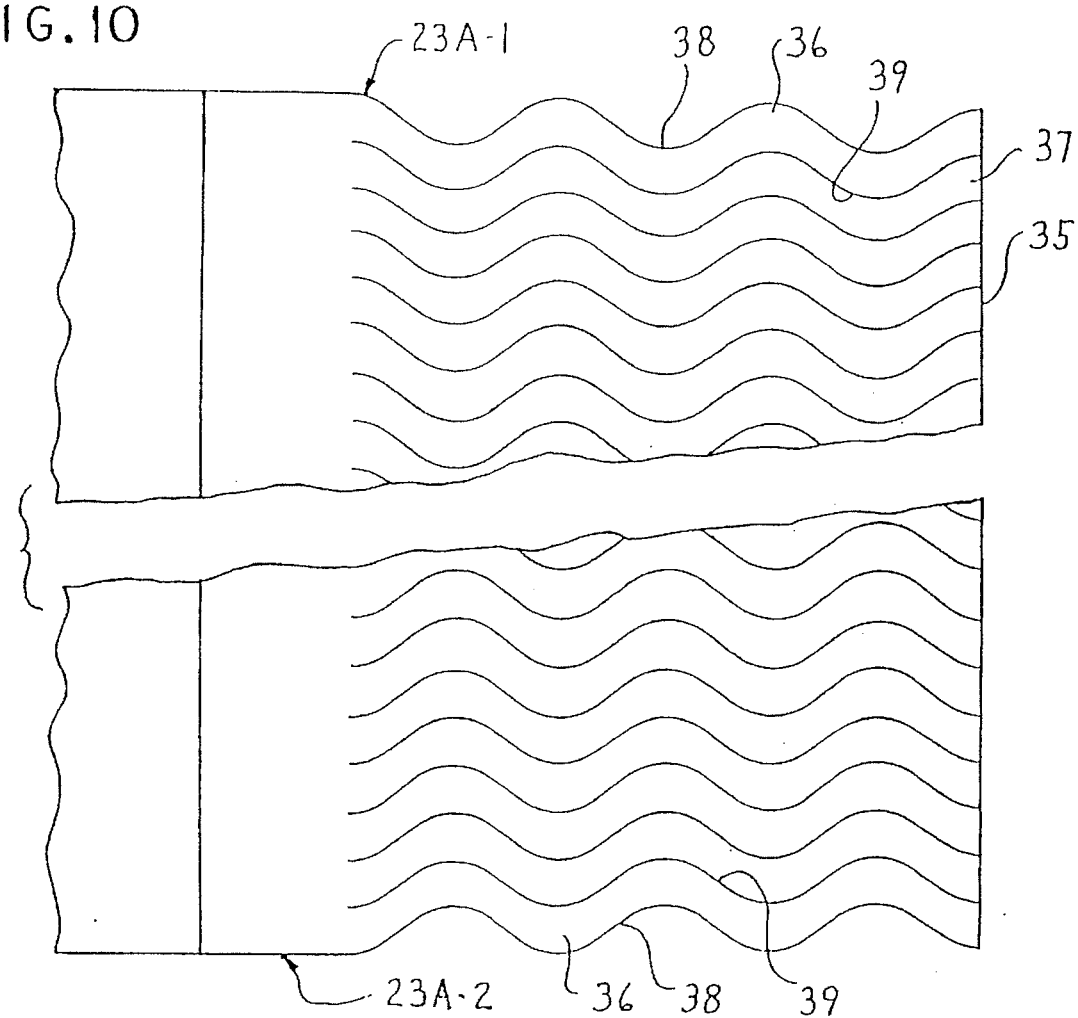
FIG. 10 is a fragmentary view taken generally along line 10—10 in FIG. 9.

Referring now to FIGS. 9 and 10, there is illustrated a conventional brush drum 16 having a plurality of improved finishing pads according to the present invention mounted thereon such that the pads extend axially of the drum, and are mounted in circumferentially spaced relation therearound, such being a conventional mounting arrangement. In the embodiment illustrated by FIGS. 9–10, a plurality of the improved pads 23A of this invention are mounted in circumferentially spaced relation around the drum. With the improved pad of the present invention, such as the pad 23A, the aggressiveness of the finishing action between the pad and the vehicle surface can be varied and in fact selected by varying the axial orientation of some of the pads 23A relative to other pads 23A. For example, and referring to FIGS. 9 and 10, the axial orientation of the circumferentially adjacent pads 23A-1 and 23A-2 is reversed, that is, the pad 23A-2 is axially inverted relative to the pad 23A-1. This thus prevents the slits in the pads 23A-1 and 23A-2 from being circumferentially aligned around the drum, and thus greatly increases the aggressiveness of the finishing action which occurs as a result of the brush strips contacting the vehicle surface, which aggressiveness is particularly desirable in situations where the vehicle surfaces are prone to be particularly dirty, such as along the rocker panels. By using the improved brush pads of the present invention wherein the edges of the strips do not extend in straight perpendicular relationship to the drum rotational axis, and by selectively axially inverting some of the pads relative to others of the circumferentially-spaced pads, this thus prevents all of the cuts or strips from being circumferentially aligned around the drum, and thus increases the aggressiveness of the frictional contact and hence the efficiency of the finishing or cleaning operation. The respective axial orientation of the pads, and the number of pads which are axially inverted, can be selected so as to permit variation in the aggressiveness of the finishing operation. For example, in one case the axial orientation of pads can be alternated between adjacent pads circumferentially around the complete periphery of the drum. Alternatively, the pads can be disposed in arcuate groups, with the pads within each group being axially oriented the same, and the pads of adjacent groups being reversely axially oriented. A still further alternative would be to provide a reversely axially oriented pad between groupings of non-reversely axially oriented pads. The embodiments illustrated by FIGS. 6–8 can also be used in the same fashion described above relative to the arrangement of FIGS. 9–10 so as to increase the aggressiveness of the finishing operation.

While the improved finishing pads of this invention can be mounted to the drum by the mounting means of FIGS. 2 and 3, it will be understood that other mounting means can also be used. For example, the inner edge part of the pad can be formed with a loop which is inserted in the drum groove, and a rod then inserted in the loop to lock it in the groove, this being a well known mounting means.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a vehicle finishing apparatus having a support rotatable about a rotation axis, and a plurality of finishing units mounted on said support in spaced relation therearound, each said finishing unit including a thin sheetlike pad of flexible material having an outer free edge adapted to contact a vehicle, said pad having an inner edge positioned adjacent to a periphery of the support, said pad also having a plurality of slits which extend inwardly from said outer free edge in a direction toward but terminating short of said inner edge so as to define a plurality of elongate cantilevered flexible strips, and mounting means cooperating between said support and said pad for releasably securing said pad to said support, comprising the improvement wherein said slits extend inwardly from said outer edge in generally nonperpendicular relationship relative to said rotational axis.

2. An apparatus according to claim 1, wherein each said strip is defined between a pair of side edges which define the width of the strip therebetween, and each of said side edges being defined by a straight line which projects outwardly toward the outer free edge at an acute angle relative to a direction perpendicular to said rotational axis.

3. An apparatus according to claim 2, wherein the edges of the strip extend in parallel relationship.

4. An apparatus according to claim 2, wherein the edges of the strip extend in angled relationship to one another so that the width of the strip progressively increases or decreases in the lengthwise direction thereof.

5. An apparatus according to claim 2, wherein the edges as defined on opposite sides of the strip both extend at an acute angle relative to the perpendicular direction but are individually angled in opposite directions from said perpendicular direction.

6. An apparatus according to claim 1, wherein said strips are formed of a nonrectangular shape.

7. An apparatus according to claim 1, wherein the strip in the lengthwise direction thereof is defined between opposed side edges, at least one of said side edges having an undulating configuration.

8. An apparatus according to claim 1 wherein said plurality of slits in circumferentially adjacent finishing units are not circumferentially aligned.

9. In a vehicle finishing apparatus having a support rotatable about a rotation axis, and a plurality of finishing units mounted on said support in spaced relation therearound, each said finishing unit including a thin sheetlike pad of flexible material having an outer free edge adapted to contact a vehicle, said pad having an inner edge positioned adjacent to a periphery of the support, said pad also having a plurality of slits which extend inwardly from said outer free edge in a direction toward but terminating short of said inner edge so as to define a plurality of elongate cantilevered flexible strips, and mounting means cooperating between said support and said pad for releasably securing said pad to said support, comprising the improvement wherein said strip defines thereon a pair of side edges which define therebetween the width of the strip and which are elongated in a lengthwise direction of the strip, and wherein at least one of said side edges is nonlinear throughout the lengthwise extent thereof.

10. An apparatus according to claim 9, wherein both of said side edges are nonlinear throughout the lengthwise extent thereof.

11. An apparatus according to claim 10, wherein both said side edges have an undulating curved configuration in the lengthwise extent thereof.

12. An apparatus according to claim 11, wherein said edges have a substantially sinusoidal configuration and define at least two sinusoidal curves throughout the length thereof.

13. An apparatus according to claim 12, wherein the side edges of the strip extend in parallel relationship to one another so that the strip is of generally uniform width throughout the length thereof.

14. An apparatus according to claim 13, wherein the sinusoidal curvature of the edges has an amplitude which approximately equals the width of the strip.

15. An apparatus according to claim 14, wherein the strip defines alternating portions of wide and narrow widths in the lengthwise direction thereof.

16. An apparatus according to claim 9 wherein first and second said finishing units are mounted in circumferentially spaced relationship on said support so that the side edges of the strips of said first and second units are not circumferentially aligned.

17. An apparatus according to claim 16 wherein said first and second units are reversely axially oriented in the support.

18. In a vehicle finishing apparatus having a generally cylindrical support mounted for rotation about its axis, and a plurality of vehicle finishing units mounted on said support in spaced circumferential relationship therearound so that said finishing units project outwardly from said support for contact with a vehicle when the support is rotated about said axis, each said finishing unit being mounted on and elongated axially along said support, each said finishing unit including a thin sheetlike pad of flexible material having an inner edge part which is disposed adjacent and projects axially along the support and an outer free edge adapted for contact with a vehicle surface, said pad having a plurality of slits which are formed therethrough and which project inwardly from said free edge in a direction toward said inner edge part so as to define a plurality of elongated flexible strips which are joined to said inner edge part and cantilevered outwardly therefrom, comprising the improvement wherein each strip is defined between a pair of lengthwise-extending side edges which terminate at the free end of the respective strip and are defined by the slits which form said strips, each of said side edges having an elongate edge portion which projects in the lengthwise direction of the strip and extends in skewed angled relationship relative to a plane which is perpendicular to said axis.

19. An apparatus according to claim 18 wherein first and second said finishing pads are substantially identical but are mounted in circumferentially spaced relationship on said support in axially inverted orientations so that the edges of the strips of said first and second pads are not circumferentially aligned.

20. An apparatus according to claim 18, wherein both said side edges have an undulating curved configuration in the lengthwise extent thereof.

21. An apparatus according to claim 18, wherein the edges of the strip extend in parallel relationship.

22. A finishing unit for a vehicle washing apparatus, said finishing unit comprising an enlarged but thin sheetlike pad of flexible clothlike material having an outer edge part which is adapted for contact with a vehicle surface and which terminates in an outer free edge which extends along an outer side of said pad, said pad also including an inner edge part having an elongate mounting part for attachment to a support of the washing apparatus, said mounting part defining an inner side edge of the finishing unit and extending in generally parallel relationship with the outer free edge, said pad also having a plurality of slits which are formed through the outer edge part of the pad and which project inwardly from said outer free edge in a direction toward but which terminate short of said mounting part so as to define a plurality of elongate cantilevered flexible strips, said strips being defined between a pair of respective lengthwise-extending side edges which terminate at the free edge and are defined by the slits which form said strips, each of said side edges having at least an elongate edge portion which projects generally in the lengthwise direction of the strip and extends at an angle skewed relative to a plane which perpendicularly intersects the inner and outer edges of the pad.

23. A pad according to claim 22, wherein the side edges of the strip are nonlinear throughout the lengthwise extent of the strip and extend in parallel relationship to one another.

24. A pad according to claim 22 wherein said side edges of said strip have an undulating configuration through a part of the lengthwise extent thereof.

\* \* \* \* \*

UNITED STATES PATENT AND TRADEMARK OFFICE
CERTIFICATE OF CORRECTION

PATENT NO. : 5,623,741
DATED      : April 29, 1997
INVENTOR(S): Gaylord J. CLARK It is certified that error appears in the above-indentified patent and that said Letters Patent is hereby corrected as shown below:

Column 9, line 4; change "Claim 14" to ---Claim 12---.

Signed and Sealed this

Eighth Day of July, 1997

Attest:

Attesting Officer

BRUCE LEHMAN
Commissioner of Patents and Trademarks